United States Patent
Fochtman et al.

(10) Patent No.: US 11,035,491 B2
(45) Date of Patent: Jun. 15, 2021

(54) FUEL PUMP SOLENOID HAVING HYDRAULIC DAMPING

(71) Applicant: Continental Automotive Systems, Inc., Auburn Hills, MI (US)

(72) Inventors: James Fochtman, Williamsburg, VA (US); John Walters, Williamsburg, VA (US); Tyler Craven, Norfolk, VA (US)

(73) Assignee: CONTINENTAL AUTOMOTIVE SYSTEMS, INC., Auburn Hills, MI (US)

( * ) Notice: Subject to any disclaimer, the term of this patent is extended or adjusted under 35 U.S.C. 154(b) by 278 days.

(21) Appl. No.: 16/024,348

(22) Filed: Jun. 29, 2018

(65) Prior Publication Data
US 2019/0003611 A1     Jan. 3, 2019

Related U.S. Application Data

(60) Provisional application No. 62/528,356, filed on Jul. 3, 2017, provisional application No. 62/528,345, filed
(Continued)

(51) Int. Cl.
*F16K 31/06*     (2006.01)
*F04B 53/10*     (2006.01)
(Continued)

(52) U.S. Cl.
CPC ......... *F16K 31/0686* (2013.01); *F02M 37/08* (2013.01); *F02M 37/10* (2013.01);
(Continued)

(58) Field of Classification Search
CPC ........ F02M 37/08; F02M 37/10; F04B 17/04; F04B 53/001; F04B 23/021; F16K 31/0686; F16K 31/0689
See application file for complete search history.

(56) References Cited

U.S. PATENT DOCUMENTS

| 1,779,420 A | * | 10/1930 | Carter | F02M 37/08 310/34 |
| 3,653,630 A | * | 4/1972 | Ritsema | B60T 8/363 251/129.15 |

(Continued)

FOREIGN PATENT DOCUMENTS

| CN | 101201034 A | 6/2008 |
| DE | 1809954 A1 | 5/1970 |

(Continued)

OTHER PUBLICATIONS

Chinese First Office Action dated Mar. 11, 2020 for the counterpart Chinese Application No. 201810719771.4.
(Continued)

*Primary Examiner* — Umashankar Venkatesan

(57) ABSTRACT

A solenoid assembly of a fuel pump includes a housing; a pole piece disposed within the housing; an armature assembly movably disposed within the housing and including an armature and a plunger; and a coil disposed within the housing. A plurality of metal disks are disposed in a stacked arrangement, coupled to the pole piece and situated so as to be impacted by the armature during a full stroke of the armature assembly. The solenoid assembly further includes at least one fluid path in fluid communication with the region surrounding the metal disks, the at least one fluid path configured such that only a portion of a secondary swept volume of fuel associated with the armature assembly during operation of the fuel pump passes through the region and decelerates the armature assembly when the armature assembly moves towards the pole piece responsive to a current passing through the coil.

20 Claims, 8 Drawing Sheets

Related U.S. Application Data on Jul. 3, 2017, provisional application No. 62/528,348, filed on Jul. 3, 2017, provisional application No. 62/528,351, filed on Jul. 3, 2017, provisional application No. 62/528,412, filed on Jul. 3, 2017, provisional application No. 62/528,417, filed on Jul. 3, 2017.

(51) Int. Cl.
| | |
|---|---|
| *F02M 37/10* | (2006.01) |
| *H01F 7/08* | (2006.01) |
| *H01F 7/16* | (2006.01) |
| *F02M 59/46* | (2006.01) |
| *F02M 51/04* | (2006.01) |
| *F02M 63/00* | (2006.01) |
| *F02M 37/08* | (2006.01) |
| *F02M 59/10* | (2006.01) |
| *F04B 23/02* | (2006.01) |
| *F02M 55/00* | (2006.01) |
| *F04B 39/10* | (2006.01) |
| *F16K 1/42* | (2006.01) |
| *F16K 15/02* | (2006.01) |
| *F16K 27/02* | (2006.01) |
| *F04B 17/04* | (2006.01) |
| *F16K 15/14* | (2006.01) |
| *F02M 51/06* | (2006.01) |
| *F02M 59/36* | (2006.01) |
| *B21D 39/06* | (2006.01) |
| *F02M 37/54* | (2019.01) |
| *F02M 37/04* | (2006.01) |

(52) U.S. Cl.
CPC ........ *F02M 51/04* (2013.01); *F02M 51/0614* (2013.01); *F02M 55/007* (2013.01); *F02M 59/10* (2013.01); *F02M 59/367* (2013.01); *F02M 59/462* (2013.01); *F02M 59/464* (2013.01); *F02M 59/466* (2013.01); *F02M 63/0019* (2013.01); *F02M 63/0078* (2013.01); *F04B 17/04* (2013.01); *F04B 23/021* (2013.01); *F04B 39/1046* (2013.01); *F04B 53/10* (2013.01); *F04B 53/103* (2013.01); *F04B 53/109* (2013.01); *F04B 53/1032* (2013.01); *F04B 53/1035* (2013.01); *F04B 53/1087* (2013.01); *F16K 1/42* (2013.01); *F16K 15/02* (2013.01); *F16K 15/028* (2013.01); *F16K 15/14* (2013.01); *F16K 27/0209* (2013.01); *F16K 31/0689* (2013.01); *H01F 7/081* (2013.01); *H01F 7/1607* (2013.01); *B21D 39/06* (2013.01); *F02M 37/043* (2013.01); *F02M 37/54* (2019.01); *F02M 2200/8053* (2013.01)

(56) References Cited

U.S. PATENT DOCUMENTS

| | | | |
|---|---|---|---|
| 6,387,487 B1 | 5/2002 | Greenberg et al. | |
| 6,776,391 B1 * | 8/2004 | Goossens | B60T 8/363 251/129.15 |
| 6,837,478 B1 * | 1/2005 | Goossens | B60T 8/363 251/129.15 |
| 9,080,684 B2 * | 7/2015 | Stahr | H01F 7/081 |
| 9,249,894 B2 * | 2/2016 | Stahr | B60T 8/363 |
| 2005/0151104 A1 * | 7/2005 | Goossens | B60T 8/363 251/129.19 |
| 2016/0108909 A1 * | 4/2016 | Fochtman | F04B 17/042 417/53 |

FOREIGN PATENT DOCUMENTS

| | | |
|---|---|---|
| DE | 102011005487 A1 | 9/2012 |
| JP | 2004130977 A | 4/2004 |

OTHER PUBLICATIONS

Chinese Office Action dated Dec. 2, 2020 for corresponding Chinese Patent Application No. 201810719771.4.
IndianOffice Action dated Mar. 8, 2021 for corresponding Patent Application No. 201814024628.

\* cited by examiner

US 11,035,491 B2

FUEL PUMP SOLENOID HAVING HYDRAULIC DAMPING

CROSS REFERENCE TO RELATED APPLICATIONS

The present application claims the benefit of the following provisional applications filed on Jul. 3, 2017: application No. 62/528,348, titled "Combined Inlet and Outlet Check Valve Seat"; application No. 62/528,345, titled "Asymmetric Spring Valve Disk"; application No. 62/528,356, titled "Hydraulic Damping of a Solenoid"; application No. 62/528,412, titled "Fuel Pump Valve Configuration and Assembly"; application No. 62/528,351, titled "Fuel Pump Solenoid Assembly Method"; and application No. 62/528,417, titled "Fuel Sending Unit Assembly and Operation." The content of these provisional patent applications are incorporated by reference herein in their entirety.

FIELD OF INVENTION

The present invention relates to a solenoid for a fuel pump, and particularly to a fuel pump solenoid having hydraulic impact damping to decelerate the moving armature of the solenoid.

BACKGROUND

Gasoline fuel pumps have been used for years and can be driven mechanically or electrically driven. Among the electrically powered fuel pumps, the most common style is submerged in a fuel tank and has a turbine to push fuel from the pump into the fuel line. This style pump is designed for a system that requires a constant flow of pressurized fuel from the tank and into the fuel line. It pumps fuel and draws electrical power for the entire time the ignition is "on" or the engine is running. Fuel typically passes through a filter between the tank and the fuel rail. Fuel injectors, which provide the fuel to the internal combustion engine, are ported into the fuel rail. These fuel injectors require relatively precise control of the fuel pressure to provide accurate metering of fuel required by the engine. To accomplish this, the fuel rail also has a pressure regulator which controls the pressure in the rail (and effectively the injectors) by allowing any overpressure fuel to pass through the regulator and return to the tank by means of an additional fuel line.

The problems with the prior fuel pump, is really a problem with the pump and the system components needed to allow the system to operate. Such prior pumps/systems are also heavily focused on automotive applications, which have high fuel flow and complex system controls which the automobile can bear the cost and the weight/size since that was the intended application for these system components. The problem for these pumps/systems appears while incorporating this system into small displacement, non-automotive systems. For example, a 125 cc scooter designed originally to operate with a naturally aspirated engine (carbureted), does not have the space in the fuel tank or the ability to bear the cost of an oversized system developed for automobiles. This example application would also have problems delivering the electrical power required to operate the fuel pump and all of the system components, especially running the pump continuously while at idle, since the system was originally designed to provide minimal electrical power used for accessories.

Solenoids have been fabricated to power electromechanical devices, including fuel pumps, for many years. At a minimum, solenoids all include a magnetic pole, a coil and an armature, but most used in high speed electromagnets have components designed to have a return path for the magnetic flux. A common configuration for solenoids is to have the armature separated from the pole and held in that position with a preloaded spring when the solenoid is de-energized, having no current circulating inside the coil. When a differential voltage is applied to the coil, electrical current builds which then generates magnetic flux. This flux creates an attraction force on the armature and when this magnetic force is equal to the spring force biasing the armature in the position away from the pole, the armature begins to move towards the pole and stores additional potential energy in the bias spring. As long as the magnetic force exceeds the other forces acting on the armature, the armature will continue moving towards the pole until it reaches a predesigned stop which counteracts the magnetic force and stops the motion.

Prior solenoid designs were plagued with problems. Earlier designs were expensive, difficult to assemble, did not operate at high frequency, failed durability, were noisy and suffered from unstable performance. The use of rubber disk "shock absorber" disposed between the displaceable armature and the stationary pole, to lessen the impact noise from the armature assembly of the energized solenoid at the end of a stroke, made proper assembly difficult and was often partially installed which impacted the solenoid's performance due to axial stroke variation. The rubber disk adversely effected operation during high frequency due to the elastomer resilience. The rubber took greater than 50 milliseconds to return from the deformed state due to impact to the at rest shape. The rubber also created stiction between the armature and the rubber disk exaggerating the negative impact on the solenoid's performance. The rubber shock absorber disk did not only impact the solenoid's performance across a single cycle, during endurance testing the dynamic performance of the rubber disk changed which changed the performance of the solenoid over time, creating failures during life testing. Lastly, the position of the pole piece of the solenoid to the armature assembly was critical to setting the stroke as well as the free operation of the armature.

SUMMARY

Example embodiments are directed to solenoid assembly for a fuel pump. In an example embodiment, the solenoid assembly includes a housing; a pole piece fixedly disposed within the housing; and an armature assembly movably disposed within the housing, relative to the pole piece. The armature assembly includes an armature and a plunger. A coil is disposed within the housing proximal to the pole piece and the armature. A plurality of metal disks are disposed in a stacked arrangement, the metal disks coupled to the pole piece and situated so as to be impacted by the armature during a full stroke of the armature assembly. The metal disks serve as shock absorbing members which facilitate to a reduction in impact noise of the armature assembly.

The housing may include one or more apertures defined therethrough, and the pole piece may include a hollow portion defined axially through the pole piece, the hollow portion in fluid communication externally of the solenoid assembly. The solenoid assembly may further include a space in the solenoid assembly surrounding the plurality of disks, a first fluid path defined in the solenoid assembly between the space surrounding the plurality of disks and the one or more apertures of the housing, and a second fluid path defined in the solenoid assembly between the hollow portion of the pole piece and the space. When the solenoid assembly is energized and the armature assembly moves towards the pole piece, a first portion of a secondary swept volume of fuel of the fuel pump passes through the space surrounding the plurality of disks and the first fluid path, and a second portion of the secondary swept volume of fuel passes through the second fluid path without passing through the space surrounding the plurality of disks, the first portion of the secondary swept volume of fuel decelerating the armature assembly as the armature assembly approaches the pole piece, thereby leading to a reduction in noise from the armature assembly impacting the disks.

The disks may be loosely disposed in the volume. Each disk may be one of a flat disc and a disk having a concave surface and a convex surface. In one aspect, at least one of the plurality of disks includes a plurality of apertures defined axially through the disk. In another aspect, at least one of the plurality of disks includes a plurality of cutout regions defined along a surface of the disk. The at least one disk includes an inner diameter edge and an outer diameter edge, and at least one cutout region extends from the inner diameter edge towards the outer diameter edge. The at least one cutout region may extend to the outer diameter edge.

The solenoid assembly may include a spring retained in the hollow portion of the pole piece, and a spring retainer which retains the spring and contacts one axial end of the spring so as to present a bias force on the plunger, the spring retainer including a through-hole defining at least part of the second fluid path.

In another example embodiment, a fluid pump includes a valve assembly; and a solenoid assembly operative connected to the valve assembly. The solenoid assembly includes a housing; a pole piece fixedly disposed within the housing; and an armature assembly movably disposed at least partly within the housing, relative to the pole piece. The armature assembly includes an armature and a plunger, and the armature assembly and the pole piece forms a pinch region when the armature assembly moves towards the pole piece. The pinch region may be defined partly by a surface of the armature assembly which causes impact at or near the completion of a full stroke of the armature assembly. The solenoid assembly further includes a coil disposed within the housing proximal to the pole piece and the armature and at least one fluid path in fluid communication with the pinch region. The at least one fluid path is configured such that only a portion of a secondary swept volume of fluid associated with the armature assembly during operation of the fluid pump passes through the pinch region and decelerates the armature assembly when the armature assembly moves towards the pole piece responsive to a current passing through the coil.

The pole piece includes a hollow portion defined axially through the pole piece, the hollow portion in fluid communication externally of the solenoid assembly, and the at least one fluid path comprises a first fluid path defined between the pinch region and one or more locations external to the housing, and a second fluid path defined in the solenoid assembly extending between the hollow portion of the pole piece and the pinch region, wherein when the solenoid assembly is energized and the armature assembly moves towards the pole piece, a first portion of the secondary swept volume of fluid of the fluid pump passes through the pinch region and the first fluid path, and a second portion of the secondary swept volume of fluid passes through the second fluid path without passing through the pinch region, the first portion of the secondary swept volume of fluid decelerating the armature assembly as the armature assembly approaches the pole piece.

The solenoid assembly may further include a spring retained in the hollow portion of the pole piece, and a spring retainer which retains the spring and contacts one axial end of the spring so as to present a bias force on the plunger, the spring retainer including a through-hole defining at least part of the second fluid path.

The housing may include one or more apertures defined therethrough and the first fluid path extends between the pinch region and the one or more apertures of the housing.

The solenoid assembly may further include a plurality of metal disks disposed in a stacked arrangement in the pinch region, the metal disks coupled to the pole piece and situated so as to be impacted by the armature during a full stroke of the armature assembly. The disks may be loosely disposed in the volume. Each disk is one of a flat disc and a disk having a concave surface and a convex surface. In one aspect, the at least one of the plurality of disks includes a plurality of apertures defined axially through the disk. In another aspect, the at least one of the plurality of disks includes a plurality of cutout regions defined along a surface of the disk.

The at least one disk includes an inner diameter edge and an outer diameter edge, and may include at least one cutout region extends from the inner diameter edge towards the outer diameter edge. The at least one cutout region may extend to the outer diameter edge.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

The following description of the example embodiments is merely exemplary in nature and is in no way intended to limit the invention, its application, or uses.

Example embodiments are directed to the solenoid assembly of a fluid pump, such as a submerged fuel pump for an apparatus such as a vehicle. The solenoid assembly is configured to be operatively connected to a valve assembly or group in forming the fluid pump. The solenoid assembly of the example embodiments is described below as being configured for operative connection with a valve assembly for a fuel pump, but it is understood that the solenoid assembly may be operatively connected to a valve assembly for a fluid pump to pump fluid in applications other than as a fuel pump.

Figure 1:
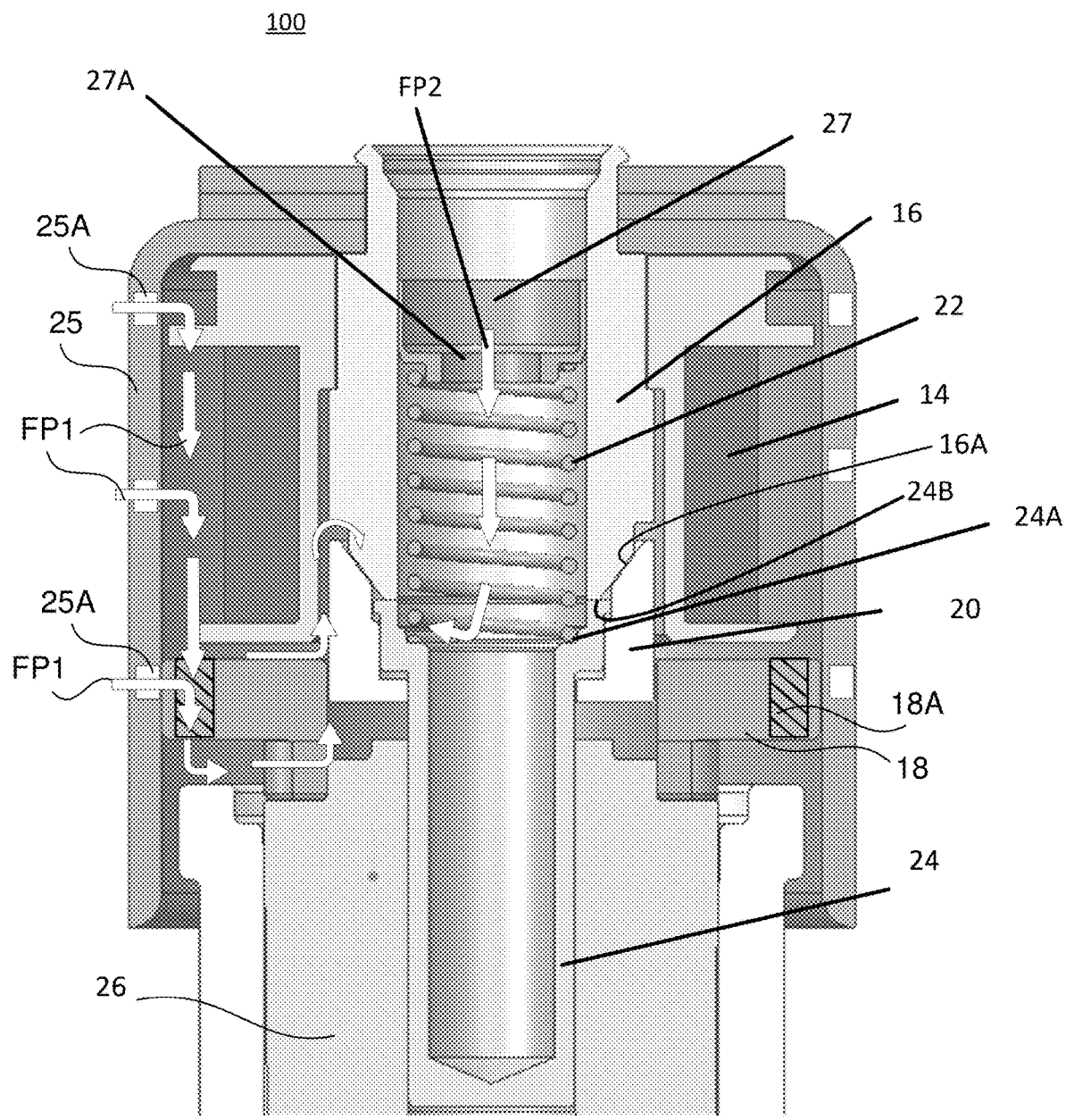
FIG. 1 is a cross sectional view of a solenoid assembly according to an example embodiment.

In a first embodiment illustrated in FIG. 1, a solenoid assembly 100 forming a power group of a fuel pump (not shown) includes a pole piece 16 positioned at the center of the solenoid assembly 100. This magnetic pole piece 16 is generally cylindrical in shape with a hollowed out inner diameter (ID). One axial end portion of the ID is directly exposed to the atmosphere and/or fluid outside of the fuel pump and the other axial end portion is exposed to the inside of the pump, where an armature assembly exists. The armature assembly includes an armature 20 and a plunger 24 connected thereto. The armature assembly is displaceable within the solenoid assembly 100. One axial end portion 16A of the pole piece 16 has a 360 degree frusto-conical shape. This end portion 16A is part of the pole piece 16 that interacts with the slanted surface of the armature 20. The radial inner surface, and/or inner diameter, of the pole piece 16 is sized for receiving a spring 22 therein. Pressed inside the pole piece 16 inner diameter is a spring retainer 27 that retains the spring 22. The spring retainer 27 is a cup-shaped plug having a cylindrical sidewall for contacting the inner surface of the pole piece 16. The spring retainer 27 further includes a ledge which is positioned orthogonally to the cylindrical sidewall and sized for retaining the upper end of the spring 22. The spring retainer 27 is fixedly secured within the pole piece 16 at a position so that the spring 22 provides the desired bias and/or load to the plunger 24 in a downward direction, relative to the view depicted in FIG. 1. A central through-hole or aperture 27A is defined axially through the base or bottom part of the cup-shaped spring retainer 27. When the solenoid assembly forms part of the fuel pump that is inserted into the fuel tank of a vehicle or other engine powered device, the central through-hole 27A allows for fuel to pass between the fuel tank and the space between the armature 20 and the pole piece 16, as described in greater detail below.

The solenoid assembly 100 further includes a housing 25 which surrounds and contains the components of the solenoid assembly discussed above. The housing 25 is largely shaped as an inverted cup and includes one or more apertures 25A defined therethrough.

Surrounding the pole piece 16 in the housing 25 is a bobbin assembly including a coil 14. The armature assembly is displaceable within the solenoid assembly 100 responsive to a current passing through the coil 14 and/or the bias force provided by the spring 22. Positioned below the pole piece 16 is the armature assembly. A bobbin retainer 18 is disposed below the armature assembly. The bobbin retainer 18 extends radially outwardly to the inner surface of the housing 25 and has a radially inward surface which is disposed proximal to the radially outer surface of the armature 20. The bobbin retainer 18 may further include one or more through-holes or apertures 18A which extend axially therethrough. The apertures 18A allow for fuel to pass therethrough for cooling the solenoid assembly, including the coil 14, and for hydraulically damping the armature assembly, as discussed in greater detail below. The armature assembly includes a controlled actuation stroke. The bobbin retainer 18 is configured to be disposed on a bushing 26 of the valve assembly to which the solenoid assembly is operatively coupled in forming the fuel pump. The plunger 24 is movably disposed at least partly in the bushing 26 of the valve assembly.

The armature 20 has a hollowed out ID that allows for the cylindrical nonmagnetic material plunger 24 to be press fit inside of the armature 20. Two interfaces exist on the top of the plunger 24 of the solenoid assembly 100 of FIG. 1. One interface is a spring seat 24A which is where the spring 22 applies a load in order to control the calibration of the fuel pump. The other is an impact area 24B which is the surface of the plunger 24 that impacts the pole piece 16 during solenoid energization once the armature 20 has traveled its full stroke. The actuation stroke/distance is the distance from the tip of the pole piece 16 (at the cone) to the impact surface 24B of the plunger 24.

When the solenoid assembly 100 is energized/powered and actuated, the armature 20 is pulled towards the pole piece 16. Eventually the plunger 24 makes contact with the pole piece 16. The point of contact between the pole piece 16 and plunger 24 is very close and axially in line with the hollowed ID of the pole piece 16. When the solenoid assembly 100 is deactivated, the spring 22 pushes the plunger 24 which in turn pushes the armature 20 back, away from coil 14 and towards the resting position of the armature 20. This actuation cycle of the solenoid assembly 100 in a fuel pump can help at low frequency (5-10 Hz) to high frequency (120 Hz).

Figure 2:
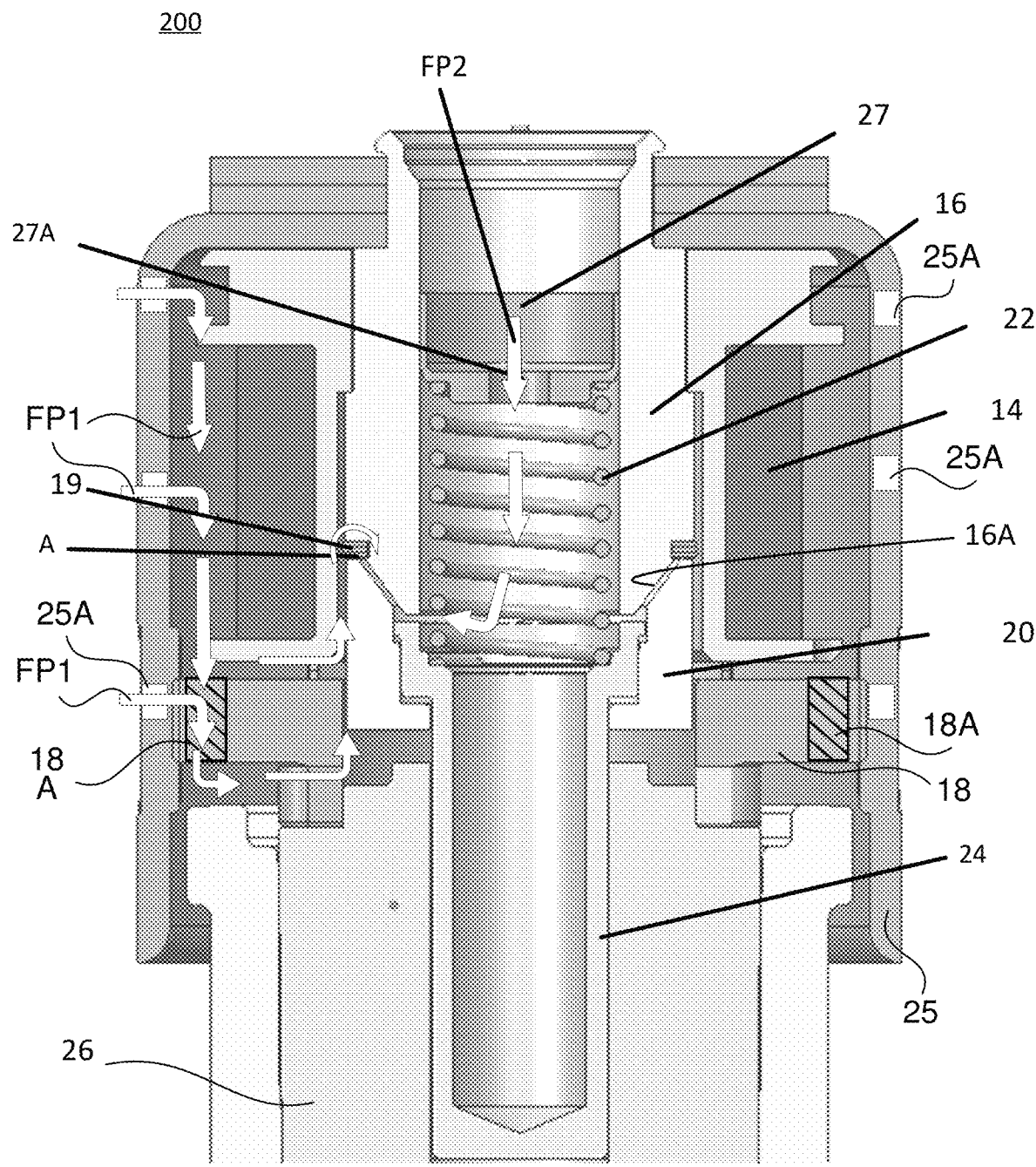
FIG. 2 is a cross sectional view of a solenoid assembly according to another example embodiment.

FIG. 2 illustrates a solenoid assembly 200 assembly according to a second example embodiment. The solenoid assembly 200 assembly of FIG. 2 includes similar components found in the solenoid assembly 200 assembly of FIG. 1, such as the coil 14, the pole piece 16, the armature assembly having the armature 20 and the plunger 24, the spring 22, and the spring retainer 27, configured as described in FIG. 1. In contrast to the solenoid assembly 100, the solenoid assembly 200 and/or the pole piece 16 thereof includes a plurality of shock absorbing, annular disks 19 which are disposed around an outer diameter of a portion of the pole piece 16 proximal to, and at the base of, the frusto-conical end portion, and abut against a downwardly facing surface of the pole piece. Further, in the solenoid assembly 200 of FIG. 2, instead of the plunger 24 contacting the bottom surface of the pole piece 16 at the end of a stroke, in this example embodiment the armature 20, moving in an upward direction due to current passing through coil 14, contacts the annular disks 19 which advantageously serve to decelerate the armature 20 and the plunger 24 prior to coming to a complete stop. In example embodiments, disks 19 serve as metal shock absorbing elements. The pole piece 16 may have a single or a plurality of the annular disks 19 attached thereto, which act to create a fluid "cushion" layer between the pole piece 16 and disks 19 which decelerates the armature 20 during impact with the pole piece 16 so as to reduce the impact noise. The metal disks 19 reduce noise without the problems of stroke control, wear during durability and difficult assembly associated with the prior designs. These disks 19 are also used to control the minimum air gap between the pole piece 16 and the armature 20, which is important in controlling magnetic field levels which have to decay when the solenoid assembly 200 is de-energized at or near the end of a stroke.

The number of disks 19 may be any number, and in the example embodiment illustrated is three. The disks 19 are thin, on the order of 0.15-0.25 mm, stainless steel and resemble a typical washer. These disks 19 are secured in a snap-fit engagement with a locking feature machined on the pole piece 16. The disks 19 act as an impact damper, reduce wear over life cycling, and maintain a precise minimum air gap between the pole piece 16 and the armature 20 which is of importance to the magnetic performance of the solenoid assembly 200 and/or the fuel pump.

Figure 3:
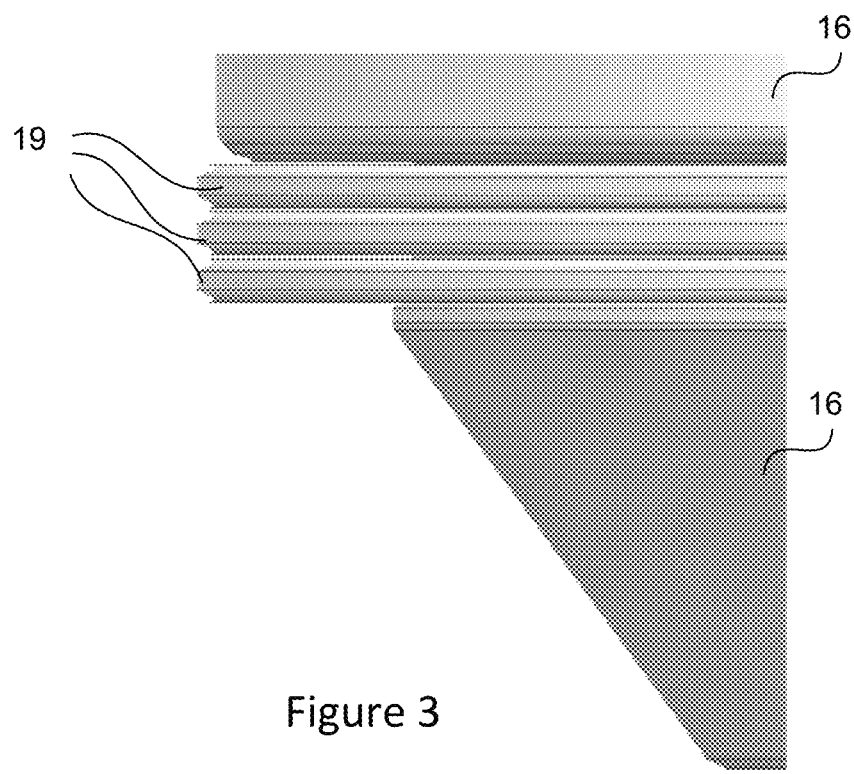
FIG. 3 is an expanded side view of a shock absorbing portion of the solenoid assembly of FIG. 2.
Figure 4:
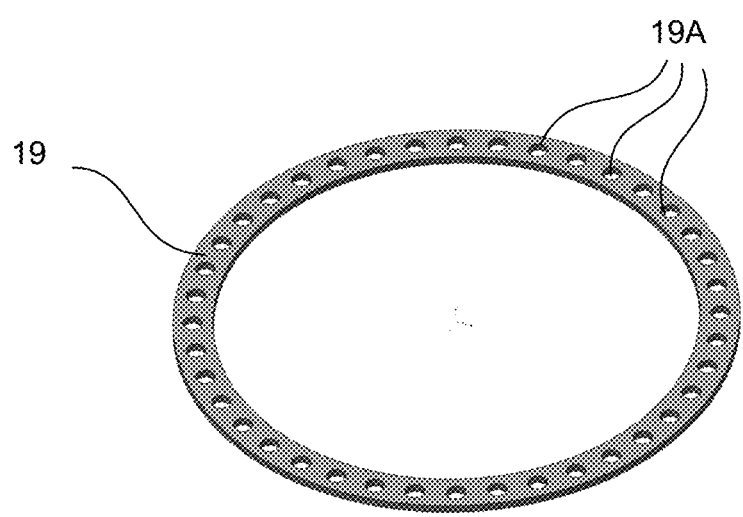
FIG. 4 is a perspective view of a shock absorbing disk of the solenoid assembly of FIG. 2 according to an example embodiment.
Figure 5:
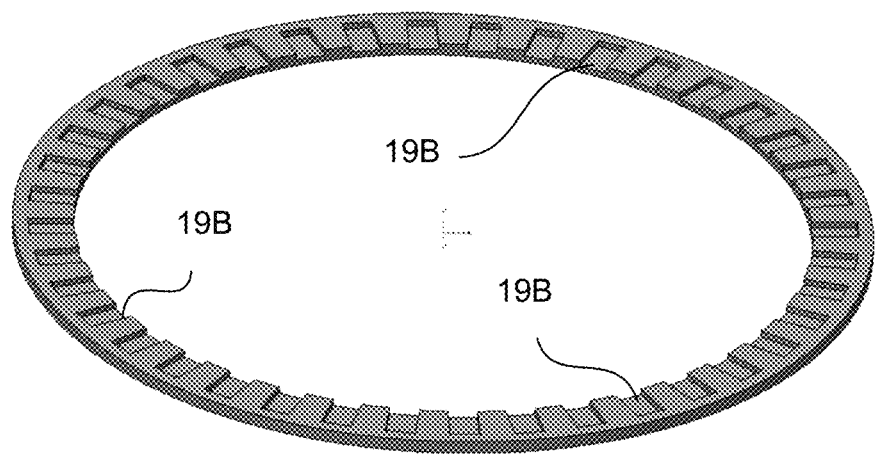
FIG. 5 is a perspective view of a shock absorbing disk of the solenoid assembly of FIG. 2 according to another example embodiment.
Figure 6:
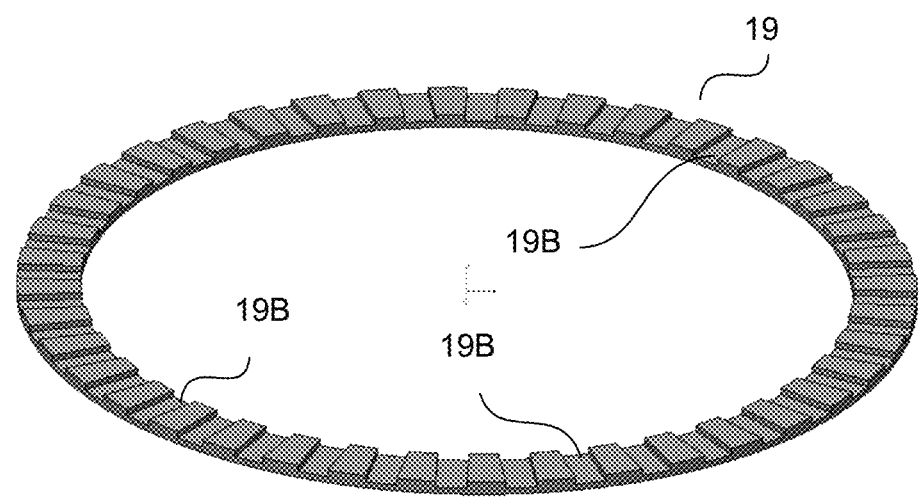
FIG. 6 is a perspective view a shock absorbing disk of the solenoid assembly of FIG. 2 according to another example embodiment.

FIG. 3 illustrates an expanded side view of a portion of the pole piece 16 and disks 19. As illustrated, disks 19 are in a stacked arrangement. In an example embodiment, disks 19 are flat, ring shaped having an inner diameter and outer diameter. In another example embodiment illustrated in FIG. 4, one or more disks 19 may include a plurality of apertures 19A defined axially through the disk. In yet another embodiment illustrated in FIG. 5, disks 19 may include a plurality of cutout portions or dimples 19B which are defined along one or both of the major surfaces of disk 19. The cutout portions 19B are disposed circumferentially along the ID of disk 19. In the illustrated embodiment, each cutout portion 19B has the shape of a rectangular prism which extends from the inner diameter edge towards the outer diameter edge, but it is understood that each cutout portion 19B may have a different cutout shape. In FIG. 6, cutout portions 19B extends along a major surface of disk 19 from the inner diameter edge to the outer diameter edge. The cutout portions 19B and apertures 19A provide pockets of fuel which, during impact by the armature 20, are compressed. Still further, each disk 19 may be shaped as a Belleville washer, having a slight convex surface so as to have a spring effect in a disk stack.

In the example embodiments, hydraulic damping is introduced into the solenoid assembly 100, 200 of the fuel pump to further reduce the noise generated from the armature assembly impacting the pole piece 16 and/or the shock absorbing disks 19. Each solenoid assembly 100, 200 includes plural fluid paths through which a secondary or "parasitic" swept volume of fuel is passed during operation of the solenoid assembly. This secondary swept volume is considered secondary relative to the primary swept volume of fuel of the pump valve to which the solenoid assembly 100, 200 is operatively coupled. In this regard, solenoid assembly 100, 200 may include the secondary pumping chamber and/or associated secondary fuel paths disclosed in U.S. patent publication 20160108909, the content of which is incorporated by reference herein in its entirety.

Specifically, a first fluid path FP1 is defined generally between the apertures 25A of housing 25 and the region surrounding the area of impact with the pole piece 16. For the solenoid assembly 100 and 200, the first fluid path FP1 includes spaces between the coil 14 and the inner surface of the housing 25, between the top surface of the bobbin retainer 18 and the bobbin, the space in the aperture 18A of the bobbin retainer 18, the space between the outer radial surface of the armature 20 and the inner radial surface of the bobbin retainer 18 and the bobbin/coil, the space beneath the bobbin retainer 18. A second fluid path FP2 is defined between the through-hole 27A of the spring retainer 27 within the hollowed out region of the pole piece 16. The first and second fluid paths are indicated in FIGS. 1 and 2 as arrows, and it is understood that the flow of fuel through the first and second fluid paths may be in the direction of the arrows or in the direction opposite thereto. In general terms, the secondary swept volume of fuel associated with the armature assembly is collected and dispersed from the solenoid assembly during reciprocation of the armature assembly when the fuel pump is operating. The secondary swept volume is discharged when the solenoid assembly is energized and collected when the solenoid assembly is de-energized. During solenoid energizing, the previously collected secondary swept volume is discharged through the second fluid path FP1 as well as the first fluid path FP1 via the region surrounding the area of impact of the armature assembly with the pole piece 16 (the impact between the top of the plunger 24 and the pole piece 16 for the solenoid assembly 100, and between the armature 20 and the disks 19 for the solenoid assembly 200). By suitably configuring the first fluid path FP1 and the second fluid path FP2, the amount of fuel and the fuel flow rate through the region surrounding the area of impact of the armature assembly with the pole piece 16 can be controlled so as to provide damping when the armature assembly moves close to the pole piece 16 near the completion of a full stroke. This is achieved by passing some of the secondary swept volume through the second fluid path FP2 for discharge without passing through the region surrounding the area of impact between the armature assembly and the pole piece (which, for the solenoid assembly 200, includes the disks 19) so that a sufficient amount of the fuel passes through such region (and subsequently through the first fluid path FP2) to provide the desired amount of damping of the armature assembly.

The operation of the solenoid assembly 100 of FIG. 1 will be described. With the solenoid assembly de-energized, in the absence of a magnetic force acting on the armature 20, the spring 22 urges the armature 20 away from the pole piece as the armature assembly toward its de-energized position. With the solenoid assembly 100 being part of a submerged fuel pump, a pressure differential exists in the space above the armature assembly and the pressure of the fuel tank such that fuel is drawn in the first fluid path FP1 and the second fluid path FP2 from the fuel tank external to the solenoid assembly, in the direction of the arrows depicted in FIG. 1, and collects in the fluid paths FP1 and FP2 and in the space between the angled or slanted surfaces of the armature 20 and the pole piece 16.

When the solenoid assembly 100 is energized, the armature 20 moves in response to the now built magnetic field, toward the pole piece 16. As the armature assembly moves closer to the pole piece, the space narrows between the armature 20 and the pole piece 16 and forces the fuel in the space as well as the space above the plunger 24 to flow therefrom. With the first fluid path FP1 being relatively narrow, the size (and leading edge, relative to the flow of fuel) of the through-hole 27A of the spring retainer 27 is configured so that the amount of fuel exiting the solenoid assembly 100 through the through-hole 27A allows for a controlled flow of fuel through the angled surfaces of the armature 20 and the pole piece 16 and particularly between the impact surface 24A of the plunger 24 with the impact surface of the pole piece 16, referred to as the "pinch region,". Having the size of the through-hole 27A too large results in fuel too quickly leaving the pinch region and the fuel insufficiently damping the plunger 24. Having the size of the through-hole 27A too small results in too much fuel remaining in the pinch region so as to cause too much damping and the armature assembly being unable to complete its stroke. With the size of the through-hole 27A correctly sized, fuel disposed in the pinch region as the plunger 24 rapidly approaches the pole piece provides damping of the plunger 24, thereby reducing the impact noise when the plunger 24 contacts the pole piece 16.

Following the armature assembly having completed its stroke, the solenoid assembly is de-energized. After the magnetic field has sufficiently decayed, the spring 22 begins moving the armature assembly to its original, de-energized position. The first fluid path FP1 and the second fluid path FP2 allows for a reduction or elimination of any pressure force to counteract the spring 22 to separate and move from the pole piece 16. As the armature assembly moves from the pole piece 16, a secondary swept volume of fuel is pulled by a pressure differential into the first fluid path FP1 and the second fluid path FP2 so as to collect in the expanding space between the pole piece 16 and the armature assembly so that the solenoid assembly 100 is able to perform damping on the armature assembly the next time the solenoid is energized.

Figure 7:
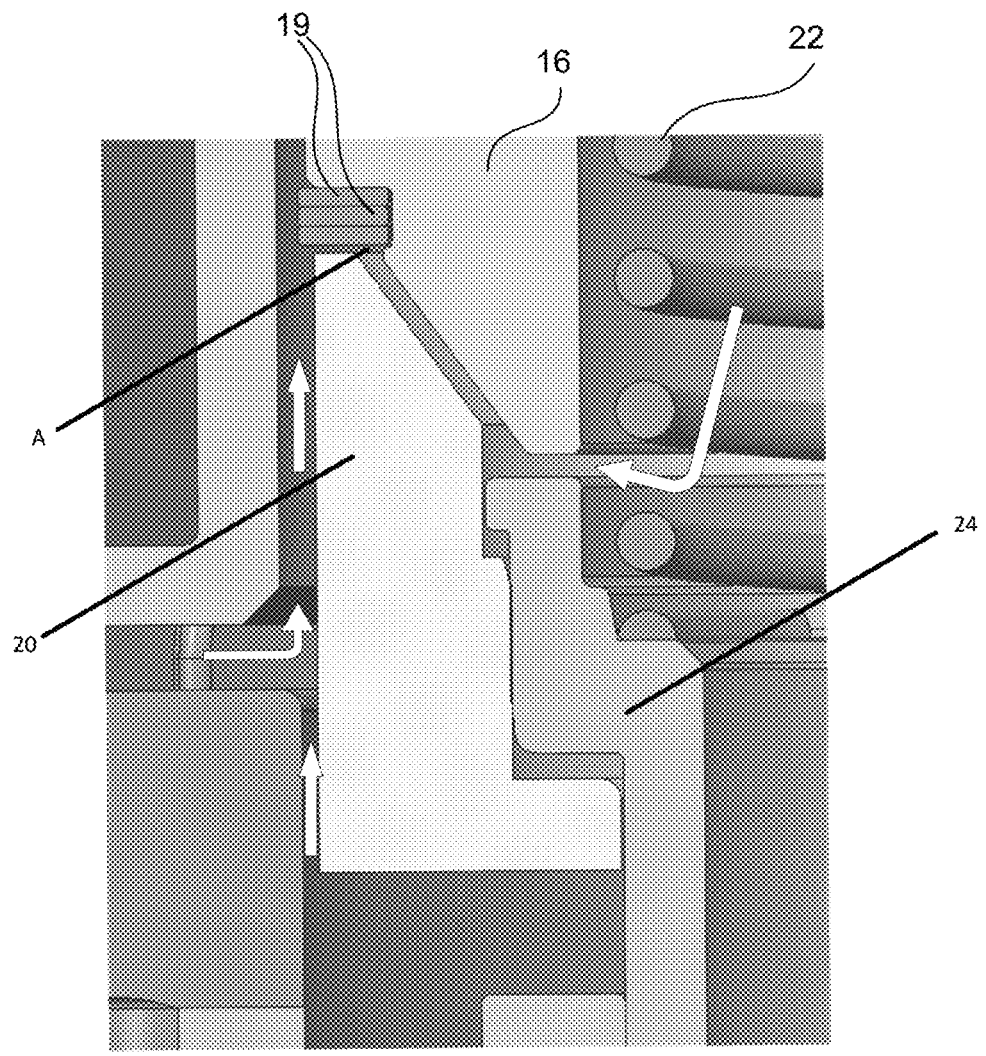
FIG. 7 is an expanded cross sectional view of a portion of a fluid path for swept volume of the solenoid of FIG. 2.

The operation of the solenoid assembly 200 will be described with respect to FIGS. 2 and 7, and somewhat resembles the operation of the solenoid assembly 100. However, as mentioned above, the armature 20, not the plunger 24, impacts the pole piece 16 via the shock-absorbing disks 19. As a result, the "pinch region" is the region A of the solenoid assembly 200 is the region in which the disks 19 are disposed. With the location of the pinch region A as well as the use of the disks 19, the secondary swept volume of the armature assembly is less than the secondary swept volume of the armature assembly of the solenoid assembly 100. As a result, the size of the through-hole 27A is smaller than the size of the through-hole 27A of the solenoid assembly 100 due to there being less fluid needing to be moved.

When the solenoid assembly 200 is energized, the armature 20 moves in response to the now built magnetic field, toward the pole piece 16. As the armature assembly moves closer to the pole piece, the space narrows between in the pinch region A forces the fuel in the space between the armature 20 and the pole piece 16, as well as the space above the plunger 24, to flow therefrom. With the first fluid path FP1 being relatively narrow, the size (and leading edge, relative to the flow of fuel) of the through-hole 27A of the spring retainer 27 is configured so that the amount of fuel exiting the solenoid assembly 200 through the through-hole 27A allows for a controlled flow of fuel through the angled surfaces of the armature 20 and the pole piece 16 and particularly between pinch region A. Having the size of the through-hole 27A too large results in fuel too quickly leaving the pinch region A and the fuel insufficiently damping the plunger 24. Having the size of the through-hole 27A too small results in too much fuel remaining in the pinch region A so as to cause too much damping and the armature assembly being unable to complete its stroke. With the size of the through-hole 27A correctly sized, fuel disposed in the pinch region A as the plunger 24 rapidly approaches the disks 19 provides damping of the plunger 24, thereby reducing the impact noise when the armature 20 contacts the stack of disks 19. With the armature 20 approaching the disks 19, the fuel in the pinch region A passes through and between the disks 19 so as to provide an enhanced deceleration of the armature assembly and with it, improved noise reduction.

The detailed operation of the operation of the solenoid assembly 200 will be described as the solenoid assembly operates in two different modes of operation—normal operation and wet priming. The noise generated from the impacting armature assembly during wet priming addresses a different solution than needed for the normal operating mode.

First consider the case of wet priming noise. As the vehicle (or other apparatus having a gas combustion engine) in which the fuel pump is disposed is placed into the "key on" mode, the engine control unit (ECU) primes the fuel injection system using the worst case (i.e., the longest by design) priming duration based on the population of pump performance and the specific system. This time is typically about 2-5 seconds. During this priming phase, the starter motor of the vehicle does not turn over the engine and the fuel injector(s) is not cycled. The fuel pump is operated at a relatively high frequency, causing the armature assembly to travel the full stroke for an initial brief duration, such as typically 10-30 cycles which pressurizes the fuel line between the fuel pump and the fuel injector(s).

The wet priming mode changes naturally, i.e., wet priming is not changed in or by the ECU, and includes changing from full stroke actuating to partial stoke actuating as the system approaches full pressure. When the pressure inside the primary pump chamber in the valve assembly of the fuel pump reaches normal operating pressure combined with a fully pressurized fuel line and no injected fuel, the outlet valve of the valve assembly to which the solenoid assembly 200 is operative connected does not open. During this portion of the priming, the only motion of the armature assembly is generated from the leakage flow passing through the diametrical clearance of the bushing 26 and any loss through backflow leakage of the inlet valve of the valve assembly as the spring 22 urges the armature assembly away from the pole piece 16. The distance of the armature 20 from the disks 19 is very small during this phase of priming, typically less than 0.1 mm at the beginning of the next actuation. At this small distance, the velocity of the armature assembly, typically about 0.2-0.3 meters per second, does not reach the impact velocities found during normal operation. This lower velocity is what requires a different solution for this operating mode, relative to the normal operating mode, although both methods ultimately contribute to noise reduction.

For this lower velocity impact, an effective method is to decelerate the slower impact using squeeze film energy during the impact. The shock absorbing disks 19 installed on the pole piece 16 are loosely attached and allow fuel to fill the voids between the disks. During the impact of the armature 20 and the disks 19, the fuel is forced from between the disks 19 and this deceleration lowers the tone, making the sound less offensive and reduces the overall noise level.

The second operational mode in which noise is reduced is the normal operation of the vehicle, and particularly at low speed and low power when the engine noise may not be sufficient to mask the noise from the fuel pump of which the solenoid assembly 200 forms a part. These operating conditions create armature distances from the shock absorbing disks 19 at the beginning of the fuel pump actuation of 0.3 to 1.0 mm depending on engine power, engine speed and the leakage fuel flow through the diametrical clearance of the bushing 26 to the plunger 24. These conditions lead to impact velocities of approximately 1-1.3 meters per second. When considering the outer diameter of the armature 20, the peak velocities of the armature plunger assembly create theoretical volumetric flow rates of more than 200 cc per second. These very high flow rates are utilized to generate back pressure to slow the armature 20 and the plunger 24 as the gap between the armature and the shock absorbing disks 19 approaches zero or gets very small, approximately about 0.02 and smaller. If the region above the armature assembly, currently the hollow pole piece 16, spring 22 and spring retainer 27, were blocked completely, all of the induced fuel flow from the secondary or parasitic swept volume would have to escape that pinch region A as the separation gets small. See FIGS. 2 and 6. The velocities would be much smaller than these in reality since the pressure to generate the flow through the pinch region A would be large enough to reduce the velocity of the armature assembly which in turn would reduce the fluid velocity and reduce the noise from the armature assembly impact.

To completely block this region would slow the attraction time of the armature assembly and make high frequency operation limited or impossible. This solution is a compromise between the need for noise damping and impact wear reduction on one hand and the performance of the fuel pump on the other hand. The region above the armature assembly has the second fluid path FP2 in which the fuel exits through the through-hole 27A in the spring retainer. The leading edge (relative to the escaping fuel) of the spring retainer 27 through-hole 27A and the diameter thereof both help control the deceleration of the armature plunger 24 by generating a pressure to decelerate the plunger as the pinch region A closes.

These two features of the solenoid assembly 200, the shock absorbing disks 19 and the fluid paths FP1 and FP2, work together in the solenoid assembly 200 of the fuel pump to help reduce the noise created by the high velocity impact of the armature assembly against the shock absorbing disks 19.

Figure 8:
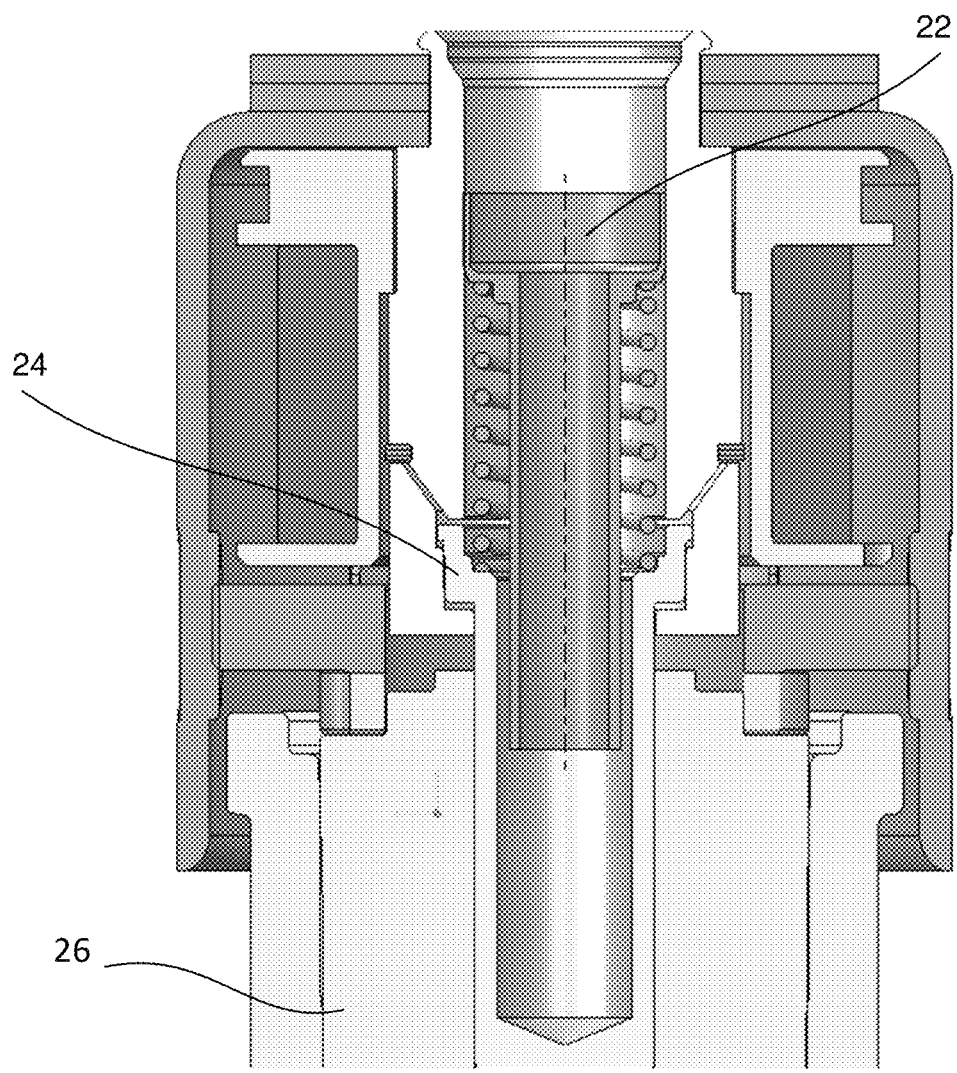
FIGS. 8 and 9 are cross sectional views of a solenoid assembly according to additional example embodiments.
Figure 9:
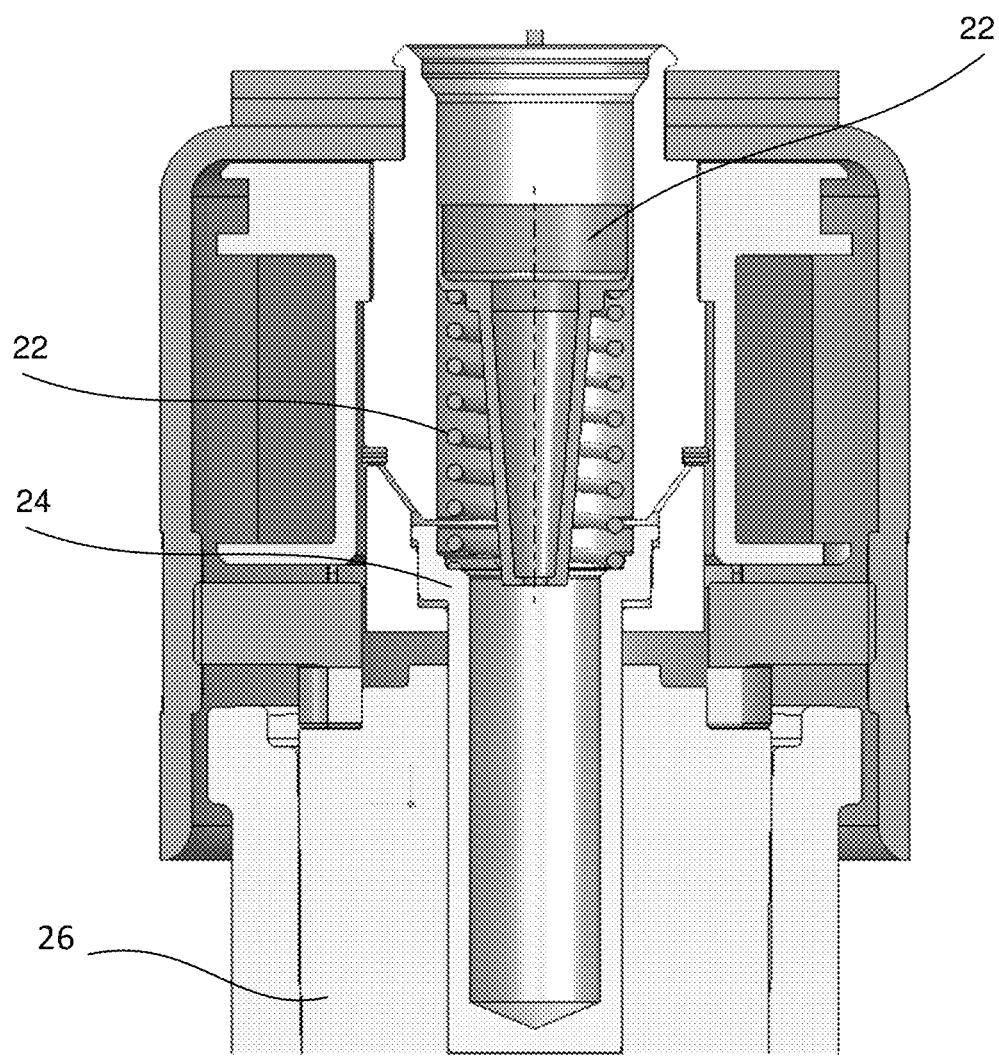

Other embodiments for utilizing the parasitic pumping of the fuel (i.e., the secondary swept volume) include the hole 27A in the spring retainer 27 being or including a check valve. The device to control the fuel flow or pressure in this region may be separated from the spring retainer 27. In addition or in the alternative, the exit of fuel from the pinch region and/or the region between the armature assembly and the lower portion of the pole piece 16 does not have to be a hole or orifice, but may be a torturous path instead. FIGS. 8 and 9 illustrate spring retainers 22 having different shapes and sizes. The spring retainer 22 of the solenoid assembly of FIG. 8 extends below the top of the plunger 24 such that the second fluid path is lengthened. In FIG. 9, the spring retainer 22 extends to the region of the top of the plunger 24, and particularly below the top of the plunger 24, and having a through-bore whose radius progressively narrows from the top of the spring 22 to the base thereof. This results in the second fluid path having a narrowed width.

Figure 10:
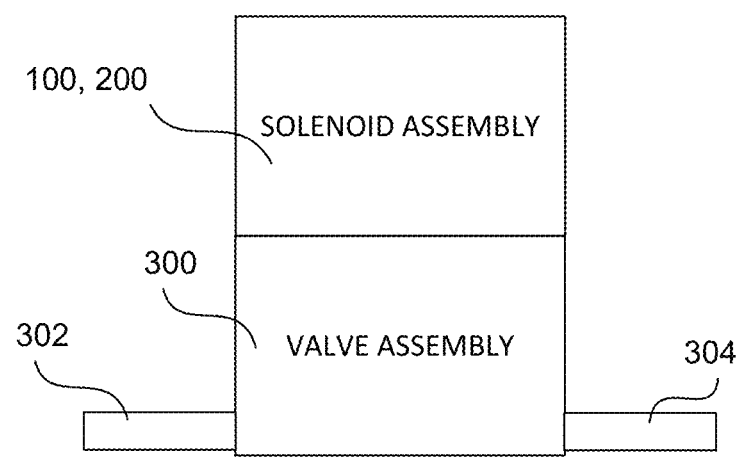
FIG. 10 is a block diagram of a fuel pump including the solenoid assembly of FIG. 1 or 2.

FIG. 10 is a block diagram illustrating a fluid pump 10 having solenoid assembly 100 or solenoid assembly 200 coupled to a valve assembly 300. In an example embodiment, the fluid pump is a fuel pump. The valve assembly 300 is operatively coupled to the solenoid assembly for pumping fuel from a fluid inlet 302 to a fluid outlet 304. The fluid outlet 304 is configured for connection to a fluid line for supplying the fluid under pressure. In an example embodiment, the valve assembly 300 includes a pump chamber which is defined in part by the plunger 24; an inlet chamber which is in fluid communication with the pump chamber via an inlet valve; and an outlet chamber which is fluid communication with the pump chamber via an outlet valve. Controlling the solenoid assembly 100 or 200 to move the armature assembly in a reciprocating manner causes fluid to flow from the fluid inlet 302 to the pump chamber via the inlet chamber and the inlet valve, and to flow from the pump chamber to the fluid outlet 302 via the outlet chamber and the outlet valve. The particular features of the valve assembly 300 and the fluid pump 10 may include the features described in U.S. patent applications identified in the cross reference section above, the contents of which are hereby incorporated by reference herein in their entirety.

The solenoid assemblies 100 and 200 provide a low cost energy efficient design to fix and/or address the problems with high frequency piston pump noise. The solenoid assemblies 100 and 200 may be used in positive displacement pumps or any other high or low frequency solenoid assemblies that are operated at least partly submerged in a fluid.

The example embodiment address issues dealing with sound in existing pump designs without adding significant cost to the pump or affecting performance negatively.

The example embodiments have been described herein in an illustrative manner, and it is to be understood that the terminology which has been used is intended to be in the nature of words of description rather than of limitation. Obviously, many modifications and variations of the invention are possible in light of the above teachings. The description above is merely exemplary in nature and, thus, variations may be made thereto without departing from the spirit and scope of the invention as defined in the appended claims.

We claim:

1. A solenoid assembly of a fuel pump, comprising:
a housing;
a pole piece fixedly disposed within the housing;
an armature assembly movably disposed within the housing, relative to the pole piece, the armature assembly including an armature and a plunger;
a coil disposed within the housing proximal to the pole piece and the armature; and
a plurality of metal disks disposed in a stacked arrangement, the metal disks coupled to the pole piece and situated so as to be impacted by the armature during a full stroke of the armature assembly,
wherein at least one of the plurality of disks includes a plurality of apertures defined axially through the disk or a plurality of cutout regions defined along a surface of the disk.

2. The solenoid assembly of claim 1, wherein the housing includes one or more apertures defined therethrough, the pole piece includes a hollow portion defined axially through the pole piece, the hollow portion in fluid communication externally of the solenoid assembly, and the solenoid assembly further comprises a space in the solenoid assembly surrounding the plurality of disks, a first fluid path defined in the solenoid assembly between the space surrounding the plurality of disks and the one or more apertures of the housing, and a second fluid path defined in the solenoid assembly between the hollow portion of the pole piece and the space, wherein when the solenoid assembly is energized and the armature assembly moves towards the pole piece, a first portion of a secondary swept volume of fuel of the fuel pump passes through the space surrounding the plurality of disks and the first fluid path, and a second portion of the secondary swept volume of fuel passes through the second fluid path without passing through the space surrounding the plurality of disks, the first portion of the secondary swept volume of fuel decelerating the armature assembly as the armature assembly approaches the pole piece.

3. The solenoid assembly of claim 2, wherein the disks are loosely disposed in the volume.

4. The solenoid assembly of claim 2, further comprising a spring retained in the hollow portion of the pole piece, and a spring retainer which retains the spring and contacts one axial end of the spring so as to present a bias force on the plunger, the spring retainer including a through-hole defining at least part of the second fluid path.

5. The solenoid assembly of claim 1, wherein each disk is one of a flat disc or a disk having a concave surface and a convex surface.

6. The solenoid assembly of claim 1, wherein at least one of the plurality of disks includes a plurality of apertures defined axially through the disk.

7. The solenoid assembly of claim 1, wherein at least one of the plurality of disks includes a plurality of cutout regions defined along a surface of the disk.

8. The solenoid assembly of claim 7, wherein the at least one of the plurality of disks includes an inner diameter edge and an outer diameter edge, and at least one cutout region extends from the inner diameter edge towards the outer diameter edge.

9. The solenoid assembly of claim 8, wherein the at least one cutout region extends to the outer diameter edge.

10. A fluid pump, comprising:
a valve assembly; and
a solenoid assembly operative connected to the valve assembly, the solenoid assembly comprising:
a housing;
a pole piece fixedly disposed within the housing;
an armature assembly movably disposed at least partly within the housing, relative to the pole piece, the armature assembly including an armature and a plunger, the armature assembly and the pole piece at least partly forming a pinch region when the armature assembly moves towards the pole piece, the pinch region defined partly by a surface of the armature assembly which causes impact at or near a completion of a full stroke of the armature assembly;
a coil disposed within the housing proximal to the pole piece and the armature; and
at least one fluid path in fluid communication with the pinch region, the at least one fluid path configured such that only a portion of a secondary swept volume of fluid associated with the armature assembly during operation of the fluid pump passes through the pinch region and decelerates the armature assembly when the armature assembly moves towards the pole piece responsive to a current passing through the coil;
wherein the solenoid assembly further comprises a plurality of metal disks disposed in a stacked arrangement in the pinch region, the metal disks coupled to and forming part of the pole piece and situated so as to be impacted by the armature during a full stroke of the armature assembly, and
wherein at least one of the plurality of disks includes a plurality of apertures defined axially through the disk or a plurality of cutout regions defined along a surface of the disk.

11. The fluid pump of claim 10, wherein the pole piece includes a hollow portion defined axially through the pole piece, the hollow portion in fluid communication externally of the solenoid assembly, and the at least one fluid path comprises a first fluid path defined between the pinch region and one or more locations external to the housing, and a second fluid path defined in the solenoid assembly extending between the hollow portion of the pole piece and the pinch region, wherein when the solenoid assembly is energized and the armature assembly moves towards the pole piece, a first portion of the secondary swept volume of fluid of the fluid pump passes through the pinch region and the first fluid path, and a second portion of the secondary swept volume of fluid passes through the second fluid path without passing through the pinch region, the first portion of the secondary swept volume of fluid decelerating the armature assembly as the armature assembly approaches the pole piece.

12. The fluid pump of claim 11, further wherein the solenoid assembly further comprises a spring retained in the hollow portion of the pole piece, and a spring retainer which retains the spring and contacts one axial end of the spring so as to present a bias force on the plunger, the spring retainer including a through-hole defining at least part of the second fluid path.

13. The fluid pump of claim 11, wherein the housing includes one or more apertures defined therethrough and the first fluid path extends between the pinch region and the one or more apertures of the housing.

14. The fluid pump of claim 11, wherein the disks are loosely disposed in the volume.

15. The fluid pump of claim 11, wherein each disk is one of a flat disc or a disk having a concave surface and a convex surface.

16. The fluid pump of claim 11, wherein at least one of the plurality of disks includes a plurality of apertures defined axially through the disk.

17. The fluid pump of claim 11, wherein at least one of the plurality of disks includes a plurality of cutout regions defined along a surface of the disk.

18. The fluid pump of claim 17, wherein the at least one of the plurality of disks includes an inner diameter edge and an outer diameter edge, and at least one cutout region extends from the inner diameter edge towards the outer diameter edge.

19. The fluid pump of claim 18, wherein the at least one cutout region extends to the outer diameter edge.

20. A fluid pump, comprising:
a valve assembly; and
a solenoid assembly operative connected to the valve assembly, the solenoid assembly comprising:
a housing;
a pole piece fixedly disposed within the housing;
an armature assembly movably disposed at least partly within the housing, relative to the pole piece, the armature assembly including an armature and a plunger, the armature assembly and the pole piece at least partly forming a pinch region when the armature assembly moves towards the pole piece, the pinch region defined partly by a surface of the armature assembly which causes impact at or near a completion of a full stroke of the armature assembly;
a coil disposed within the housing proximal to the pole piece and the armature; and
at least one fluid path in fluid communication with the pinch region, the at least one fluid path configured such that only a portion of a secondary swept volume of fluid associated with the armature assembly during operation of the fluid pump passes through the pinch region and decelerates the armature assembly when the armature assembly moves towards the pole piece responsive to a current passing through the coil;
wherein the pole piece includes a hollow portion defined axially through the pole piece, the hollow portion in fluid communication externally of the solenoid assembly, and the at least one fluid path comprises a first fluid path defined between the pinch region and one or more locations external to the housing, and a second fluid path defined in the solenoid assembly extending between the hollow portion of the pole piece and the pinch region, wherein when the solenoid assembly is energized and the armature assembly moves towards the pole piece, a first portion of the secondary swept volume of fluid of the fluid pump passes through the pinch region and the first fluid path, and a second portion of the secondary swept volume of fluid passes through the second fluid path without passing through the pinch region, the first portion of the secondary swept volume of fluid decelerating the armature assembly as the armature assembly approaches the pole piece;
wherein the solenoid assembly further comprises a plurality of metal disks disposed in a stacked arrangement in the pinch region, the metal disks coupled to and forming part of the pole piece and situated so as to be impacted by the armature during a full stroke of the armature assembly, and wherein at least one of the plurality of disks includes a plurality of apertures defined axially through the disk or a plurality of cutout regions defined along a surface of the disk.

* * * * *